United States Patent

[15] 3,638,361

Church

[45] Feb. 1, 1972

[54] RUBBER MOLDINGS FOR AUTOMOBILE WINDOWS

[72] Inventor: Herman S. Church, Cuyahoga Falls, Ohio

[73] Assignee: Teledyne Mid-America Corporation, Hartville, Ohio

[22] Filed: May 11, 1970

[21] Appl. No.: 36,342

[52] U.S. Cl.....................................49/479, 49/391, 49/494, 52/716
[51] Int. Cl..........................................................E06b 7/23
[58] Field of Search....................49/482, 479, 475, 489, 494, 49/495, 391, 48, 165, 333-337, 493; 52/716-718, 397, 400, 403

[56] References Cited

UNITED STATES PATENTS

| | | | |
|---|---|---|---|
| 2,484,514 | 10/1949 | Lane et al. | 49/391 |
| 2,593,387 | 4/1952 | Dodge | 49/391 |
| 2,606,059 | 8/1952 | Wernig | 49/391 X |
| 2,720,685 | 10/1955 | Harris | 49/479 |
| 3,436,891 | 4/1969 | Church | 46/391 X |

Primary Examiner—David J. Williamowsky
Assistant Examiner—Philip C. Kannan
Attorney—Frease & Bishop, Stephen L. King and Kenneth W. Mateer

[57] ABSTRACT

A generally triangular reinforced rubber gasket for automobile quarter vent windows having a metal reinforcing strip embedded and molded in two of the triangular gasket leg members. The diagonal reinforcing strip leg has integral offset attachment means and a bendable end tab for mounting the gasket in a window frame. The reinforced horizontal gasket leg is formed with drain means and an opening for a window pivot post. The reinforced gasket has usual flanges for sealing with the window frame and also with the window glass when the latter is in closed position.

6 Claims, 12 Drawing Figures

PATENTED FEB 1 1972

INVENTOR.
Herman S. Church

BY

Frease & Bishop
ATTORNEYS

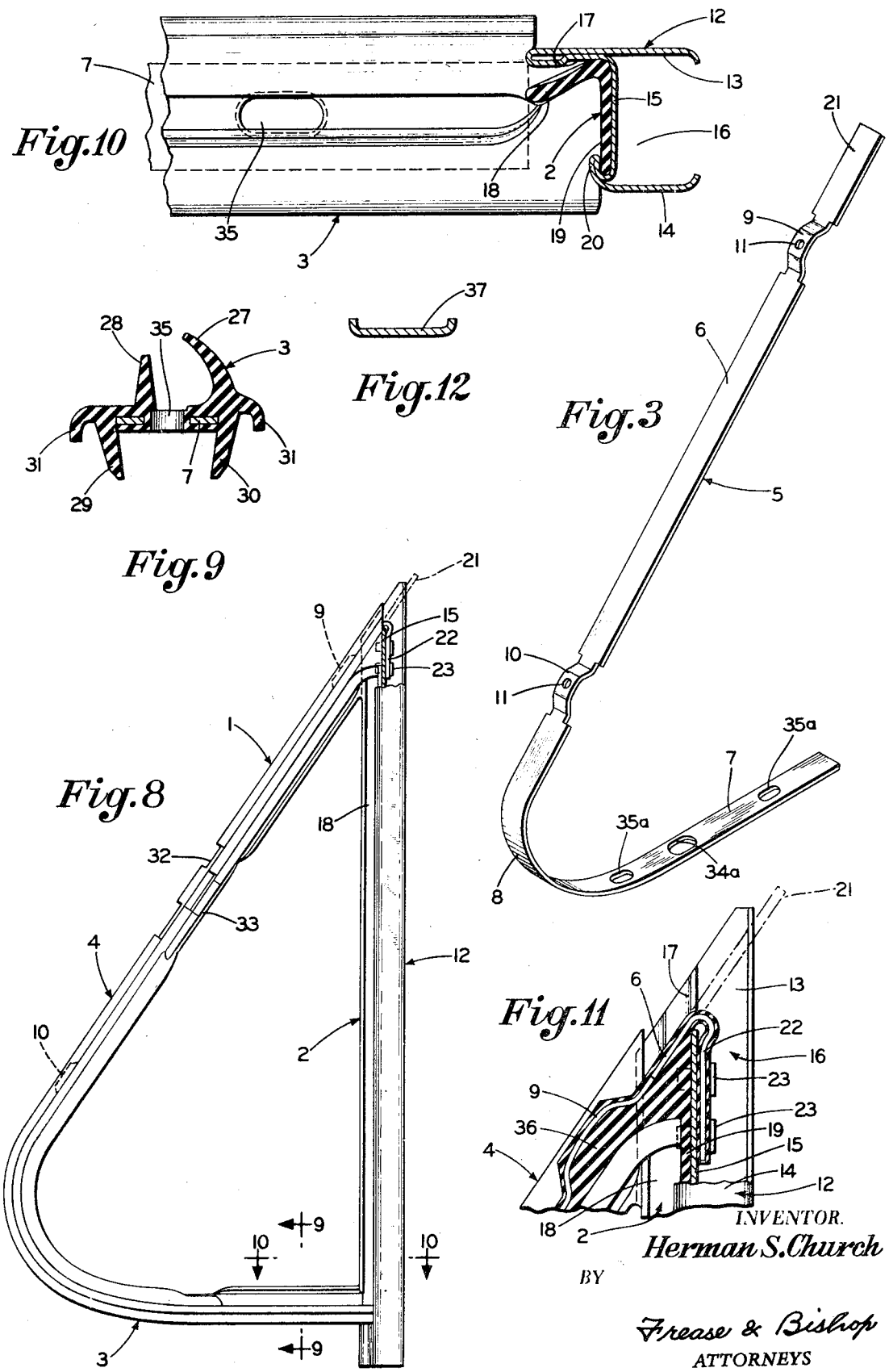

RUBBER MOLDINGS FOR AUTOMOBILE WINDOWS

BACKGROUND OF THE INVENTION

1. Field of the Invention

The invention relates to reinforced rubber moldings used as gaskets or sealing strips that engage and seal the triangular pivoted window when closed in the front door of an automobile. More particularly the invention relates to rubber gaskets having a metal reinforcing strip integrally molded within the gaskets and having integral offset attachment means for stably mounting the gasket in the window frame.

2. Description of the Prior Art

The controlled-vent or quarter-vent windows in the front doors of automobiles usually are generally triangular in shape and are provided with gaskets or seals surrounding the triangularly shaped pivoted glass windows particularly to air-conditioned automobiles. Early forms of gasket constructions involved a separate rubber gasket strip secured to the window frame along each of the three sides of the triangular window opening. The gasket strips were engaged by the edges of the glass or by channel-shaped metal reinforcement on the glass edges, when the triangular glass window was closed.

Later the rubber gasket design was changed to a unitary or single triangularly shaped gasket with metal reinforcement incorporated on the upright leg of the triangle for mounting the gasket in the window frame. The horizontal leg of the triangular gasket and the diagonal leg were engaged and mounted in undercuts in a metal retaining device mounted in the frame.

Later constructions used a complicated stamped and fabricated channel-shaped metal mounting member assembled with a window frame post member and other parts of a window frame. The mounting member channel has inturned edges for tongue and groove engagement with the gasket assembled therein.

Difficulties are experienced with these prior constructions from wind noise where the gasket comprises separate pieces. The joints between the separate pieces promote wind noise. Also in air-conditioned cars the joints are a source of leakage at an undesired location. The instability of unreinforced triangular gasket legs lowers the efficiency of the seal. Where a fabricated stamped metal mounting member is used, it is difficult to provide an effective seal between the gasket and window frame because of instability of the gasket only held by the tongue and groove engagement between the stamping and gasket. "Gunking" similar to caulking has been used to provide more efficient seals and to eliminate wind noise but this is messy and an undesirable solution for the problems.

Further, these prior expedients involve expensive stampings and assembly operations which result in increased costs. Thus, there has been and is an existing need for a more efficient and less costly gasket construction for controlled-vent automobile windows.

SUMMARY OF THE INVENTION

Objectives of the invention include providing a new triangular rubber gasket construction with integral metal reinforcement means embedded in the horizontal and diagonal gasket legs and with offset securing means formed integrally as a part of the reinforcement means for mounting the gasket in the window frame; providing an improved gasket construction which is lighter in weight, less expensive to manufacture and more stable in use than prior gaskets; providing an improved gasket construction free from openings which promote wind noise or air leakage; providing an improved gasket construction which eliminates the requirement of using a sealing compound or "gunking" in assembling the gasket with the window frame; and providing a gasket construction which can easily be mounted stably in a window frame, which eliminates difficulties heretofore encountered, achieves the objectives indicated, solves problems and satisfies needs existing in the art.

These objects and advantages are obtained by the reinforced rubber gasket construction for automobile quarter-vent windows, the general nature of which may be stated as including a generally triangular rubber gasket formed of integral, vertical, horizontal and diagonal molded rubber leg members; a flat metal reinforcing strip having horizontal and diagonal leg portions molded and embedded within and bonded to the horizontal and diagonal gasket leg members; offset attachment means formed at spaced intervals at least in the diagonal trip leg portion; bendable attachment means provided at the upper end of the diagonal strip leg portion for securing the gasket to a vertical window frame post; and the gasket leg members having usual projecting flange means for sealing with the window frame and window glass when the latter is in closed position.

BRIEF DESCRIPTION OF THE DRAWINGS

A preferred embodiment of the invention—illustrative of the best mode in which applicant has contemplated applying the principles—is set forth in the following description and shown in the drawings, and is particularly and distinctly pointed out and set forth in the appended claims.

FIG. 3 is a perspective view of a reinforcing strip which is molded within the rubber gasket of FIGS. 1 and 2;

FIG. 8 is a side view similar to FIG. 1 with parts broken away showing the gasket attached to a vertical window frame post;

FIG. 9 is a view similar to FIGS. 6 and 7 taken on the line 9—9, FIG. 8;

FIG. 10 is an enlarged fragmentary sectional view looking in the direction of the arrows 10—10, FIG. 8;

FIG. 11 is an enlarged fragmentary view with parts in section showing the top corner gasket assembly of FIG. 8; and FIG. 12 is a sectional view of an alternate reinforcing strip shape.

Similar numerals refer to similar parts throughout the drawings.

DESCRIPTION OF THE PREFERRED EMBODIMENT

Figure 1:
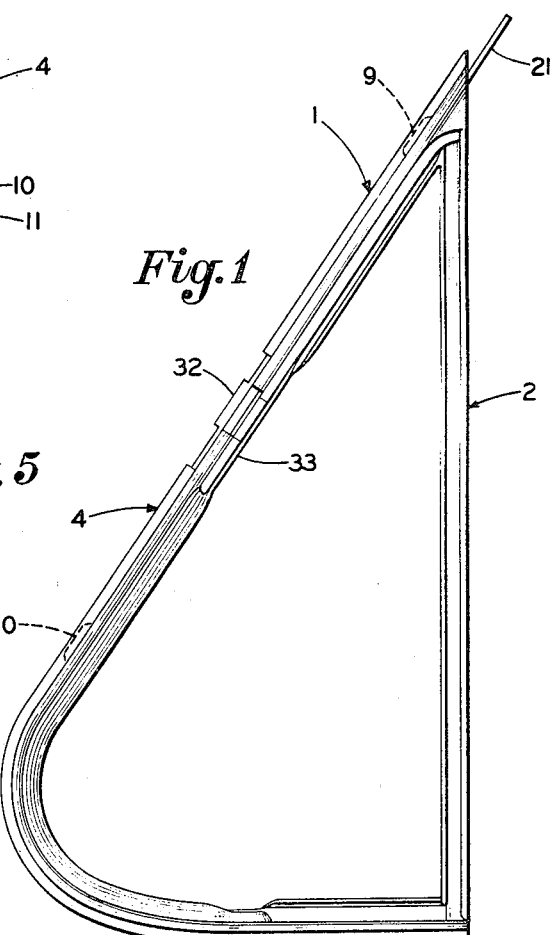
FIG. 1 is a side view looking at the exterior side of an improved reinforced molded rubber gasket for a glass quarter-vent window.

A generally triangular-shaped molded gasket indicated at 1 (FIGS. 1 and 2) has a vertical leg member 2, a horizontal leg member 3, and a diagonal leg member 4. Gasket 1 is provided with structural firmness and stability by the flat V-shaped metal strip 5 (FIG. 3) which is integrally molded and embedded in gasket 1 and forms the inner frame for leg members 3 and 4. Reinforcing strip 5 has diagonal and horizontal legs 6 and 7 which are connected by curved portion 8.

Spaced upper and lower offset pads 9 and 10 are formed spaced outward of the remainder of the strip in leg 6 to provide attachment means for mounting the gasket 1 in a window frame. Openings 11 are formed in each pad 9 and 10 to receive self-tapping screws by which the gasket 1 is mounted within and attached or secured to a diagonal window frame member, not shown.

Gasket 1 is molded from rubber in a usual manner in molds to provide the shape and sectional contour required for quarter-vent window gaskets. Gasket 1 is usually mounted in a front auto window frame, and a triangular glass window may be pivotally mounted for opening and closing movement within the gasket and window frame.

The auto window frame may include a vertical post 12 (FIGS. 8, 10, and 11) having an inner flange 13, an outer flange 14, and a web 15. A channel 16 is formed between flanges 13 and 14 at one side of web 15, and a corner recess 17 is formed by flange 13 and web 15 at the other side of web 15 (FIG. 10).

Gasket leg 2 typically has an angular shape in cross section comprising flanges 18 and 19. Flange 18 is engaged by the inner vertical edge of the window when closed and sealed thereby and flange 19 is mounted in post corner recess 17 with its outer free edge engaged and clamped by the curled edge 20 of outer post flange 14.

The upper end 21 of the diagonal leg 6 of reinforcing strip 5 initially extends beyond the upper corner of the gasket between legs 2 and 4 as indicated in dot-dash lines in FIGS. 8 and 11. When the gasket is assembled to the post 12, the projecting upper strip end 21 is bent downward as shown at 22 and is connected preferably by rivets 23 to the upper end of post web 15.

The rubber portion of the reinforced gasket 1 shrinks somewhat after vulcanizing upon cooling when removed from the mold but the reinforcing strip embedded therein does not. Thus, the rubber is slightly stretched or in tension on the strip 5 and when the gasket is assembled with window post 12 and the strip end 21 connected to the post, the vertical leg 2 of gasket 1 also is stretched and held firmly and stably in place.

Figure 6:
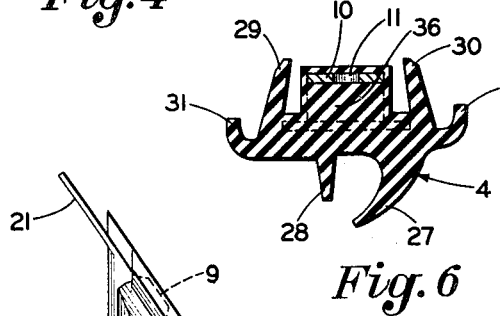
FIG. 6 is an enlarged sectional view taken on the line 6—6, FIG. 2.
Figure 7:
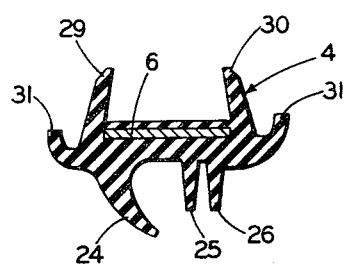
FIG. 7 is a view similar to FIG. 6 taken on the line 7—7, FIG. 2.

Gasket leg 4 preferably has a typical molded cross section in its upper portion as shown in FIG. 7 and in its lower portion as shown in FIG. 6. Sealing flanges 24, 25, 26, 27, and 28 are engaged by areas of the diagonal edge surfaces of the window glass when the latter is closed. Curved flanges 24 and 27 engage window edge face portions, and flanges 25, 26, and 28 are bent by and engage edge portions of the window glass or a channel member covering the glass edge to seal the window when closed. Gasket flanges 29, 30, and 31 engage and are clamped by and to the window frame and frame trim members in a usual manner.

Figure 2:
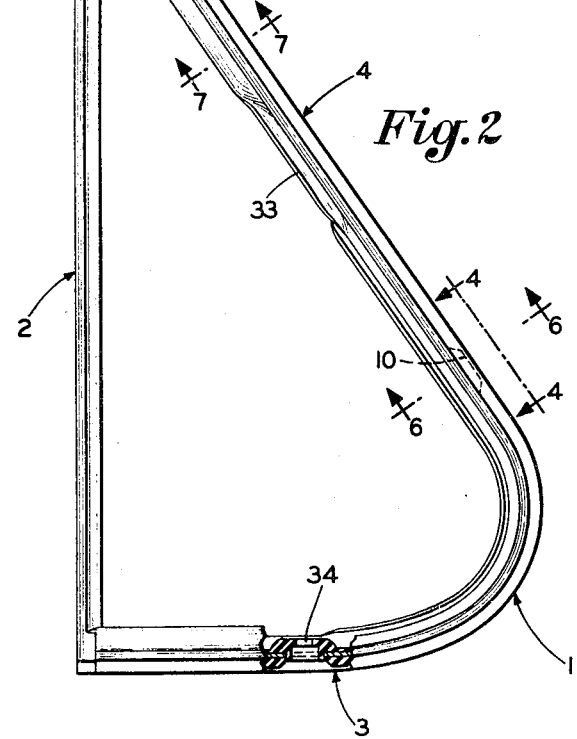
FIG. 2 is a similar side view of the interior side of the molded gasket shown in FIG. 1.

Gasket zones of diagonal leg 4 typically are shaped at 32 (FIG. 1) and 33 (FIG. 2) to accommodate the typical upper pivot clip for the window. The lower pivot pin for the window frame may project downward through pivot opening 34 formed in the horizontal gasket leg 3 (FIG. 2).

Sections of the gasket leg 3 on either side of opening 34 are typically formed in cross section with glass and frame sealing flanges similar to those shown in FIGS. 6 and 7 for leg 4. The shape (FIG. 9) to the left of opening 34 in FIG. 2 is similar to the shape (FIG. 6) at the upper end of leg 4.

Drain holes 35 may if desired be formed in leg 3 on either side of pivot opening 34 (FIGS. 9 and 10), the portions of the opening 34 and holes 35 which extend through the strip 5 being indicated at 34a and 35a in FIG. 3.

Figure 4:
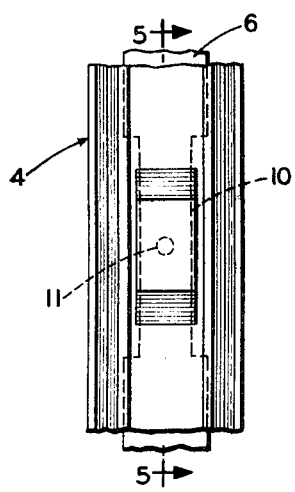
FIG. 4 is an enlarged fragmentary view looking in the direction of the arrows 4—4, FIG. 2.
Figure 5:
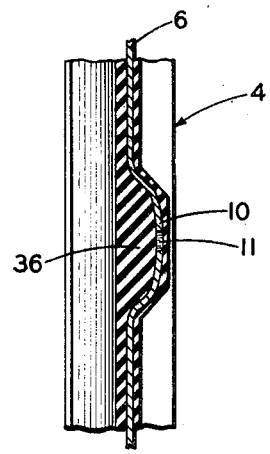
FIG. 5 is a sectional view taken on the line 5—5, FIG. 4.

The stable mounting, as indicated, of gasket 1 in a window frame is an important feature of the invention. This insures an efficient window seal when the window is closed. There are no joints for leakage between separate gasket sections. The screws which engage the attachment pads 9 and 10 (FIGS. 4 and 5) in openings 11 to mount the gasket within a window frame, screw into the thick rubber backup blocks 36 and are embedded therein. Thus, the joint is sealed and the screw tip is gripped by the rubber.

More strength or rigidity may be imparted to the rubber gasket 1 is desired by forming the metal reinforcing strip 5 to have a channel-shaped cross section as shown at 37 in FIG. 12.

Gasket 1 integrally molded with reinforcing strip 5 having the integral attachment pads 10 eliminates the requirement of any separate clips or pieces to mount gasket 1 in a window frame. Also the improved construction avoids the required use of "gunking."

Accordingly, the present invention provides an improved rubber gasket construction reinforced with a metal strip which is integrally molded with the gasket body; provides a construction with attachment means formed as an integral part of the gasket; provides a construction which is completely sealed with no holes or passages for water or air to enhance wind noise or permit air leakage; provides a gasket that is very easy to install with low installation costs and which fits the window frame tightly on installation without special adjustments or use of a plastic-type sealer; provides a construction lighter in weight, less expensive to manufacture and more foolproof than prior assemblies; and provides a simplified construction eliminating difficulties encountered with prior devices, achieving the objectives and solving problems existing in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved rubber gasket for automobile windows is constructed and used, the characteristics of the new construction, and the advantageous, new and useful results obtained; the new and useful structures, devices, elements, arrangements, parts, and combinations are set forth in the appended claims.

I claim:

1. Reinforced rubber gasket construction for automobile quarter-vent glass windows, including a generally triangular molded rubber gasket having integral diagonal, horizontal, and vertical leg members; a metal reinforcing strip having at least diagonal and horizontal leg portions molded within and bonded integrally to the diagonal and horizontal gasket leg members throughout their extent; and attachment means formed in said reinforcing strip at spaced intervals along at least said diagonal leg portion including integral pads formed in the strip in offset relation to the remainder of the strip leg portion and an outwardly presented attachment device receiving opening formed in each pad.

2. The gasket construction defined in claim 1 in which an enlarged rubber backup block is provided within each offset strip portion inward of each opening.

3. The gasket construction defined in claim 1 in which a bendable extension of the strip projects outwardly from the gasket beyond the triangle corner formed between the upper ends of the diagonal and vertical gasket legs adapted to be bent downwardly along the vertical leg for attachment to the upper end of a vertical window frame post.

4. Reinforced rubber gasket construction for automobile quarter-vent glass windows, including a generally triangular molded rubber gasket, the gasket having integral diagonal, horizontal and vertical leg members; a metal gasket-reinforcing strip having diagonal and horizontal leg portions connected by a corner, spaced offset pads formed in the diagonal strip leg portion, and the diagonal leg portion having a free end; the strip being molded and bonded integrally to the gasket with the strip diagonal and horizontal leg portions respectively embedded within the gasket diagonal and horizontal leg members, with the strip pads offset outwardly with respect to the triangular shape of the gasket, and with the free strip end projecting beyond the triangle corner between the upper ends of the diagonal and vertical gasket legs; and the pads and free end of the reinforcing strip being formed with attachment connector means, whereby the free end of the strip may be bent and attached to the top of a vertical window frame post, and the pads may be attached to a diagonal window frame member to mount the gasket stably in an automobile window frame.

5. The gasket construction defined in claim 4 in which an integral enlarged rubber backup block portion of the gasket diagonal leg member is located inward of each offset strip pad.

6. The gasket construction defined in claim 4 in which the rubber in the diagonal and horizontal leg members of the gasket is tensioned on the embedded strip portions due to rubber shrinkage following molding to hold the gasket members in a stable position for sealing a window moved to closed position within the gasket.